(12) United States Patent
Nagata et al.

(10) Patent No.: US 11,914,384 B2
(45) Date of Patent: Feb. 27, 2024

(54) ENERGY CONSUMPTION ESTIMATION DEVICE AND ENERGY CONSUMPTION ESTIMATION METHOD

(71) Applicant: TOYOTA JIDOSHA KABUSHIKI KAISHA, Toyota (JP)

(72) Inventors: Yu Nagata, Tokyo (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 17/532,191

(22) Filed: Nov. 22, 2021

(65) Prior Publication Data
US 2022/0214691 A1    Jul. 7, 2022

(30) Foreign Application Priority Data
Jan. 4, 2021 (JP) ................................ 2021-000227

(51) Int. Cl.
*G06Q 50/30* (2012.01)
*G05D 1/00* (2006.01)

(52) U.S. Cl.
CPC .......... *G05D 1/0217* (2013.01); *G05D 1/0005* (2013.01)

(58) Field of Classification Search
None
See application file for complete search history.

(56) References Cited

U.S. PATENT DOCUMENTS

| | | | | |
|---|---|---|---|---|
| 5,913,917 A | * | 6/1999 | Murphy | B60R 16/0232 701/123 |
| 8,880,333 B2 | * | 11/2014 | Calkins | G01C 21/3469 701/410 |
| 10,429,199 B2 | * | 10/2019 | Mason | G06Q 10/063112 |
| 10,678,234 B2 | * | 6/2020 | Sun | G01C 21/3469 |

(Continued)

FOREIGN PATENT DOCUMENTS

| | | | |
|---|---|---|---|
| CN | 101788298 A | 7/2010 | |
| EP | 4027113 A1 * | 7/2022 | ............ B60W 50/12 |

(Continued)

OTHER PUBLICATIONS

Fiori, Chiara, Kyoungho Ahn and Hesham A Rakha. "Power-based electric vehicle energy consumption model: Model development and validation." Applied Energy 168 (2016): 257-268. (Year: 2016).*

*Primary Examiner* — Redhwan K Mawari
*Assistant Examiner* — Kai Nmn Wang
(74) *Attorney, Agent, or Firm* — Sughrue Mion, PLLC (57) ABSTRACT

An energy consumption estimation device includes a reception unit configured to receive, from a user, request information including a departure point and a destination, a route derivation unit configured to derive a plurality of travel routes based on the departure point and the destination included in the request information, an acquisition unit configured to acquire section energy consumption in a case where a vehicle travels on a road section, which is derived based on information on vehicle speed and information on road undulations, and an estimation unit configured to respectively estimate energy consumption of the vehicle in a case where the vehicle travels on the derived travel routes by adding section energy consumption for road sections included in the travel route.

7 Claims, 5 Drawing Sheets

(56) References Cited

U.S. PATENT DOCUMENTS

| | | | |
|---|---|---|---|
| 10,890,459 B2* | 1/2021 | Matsumura | G01C 21/3484 |
| 2010/0114473 A1 | 5/2010 | Kono et al. | |
| 2012/0029803 A1* | 2/2012 | Yasushi | B60R 16/0236 |
| | | | 701/123 |
| 2014/0114556 A1* | 4/2014 | Pan | G08G 1/0129 |
| | | | 701/119 |
| 2015/0134206 A1* | 5/2015 | Matsunaga | B60W 10/08 |
| | | | 701/123 |
| 2015/0369619 A1* | 12/2015 | Kim | G01C 21/3469 |
| | | | 701/22 |
| 2016/0244062 A1* | 8/2016 | Tudosie | B60W 50/0097 |
| 2018/0172462 A1* | 6/2018 | De Nunzio | G01C 21/343 |
| 2018/0231389 A1* | 8/2018 | De Nunzio | G01C 21/3446 |
| 2020/0279195 A1 | 9/2020 | Kobori et al. | |
| 2020/0391612 A1* | 12/2020 | Lee | G01C 21/3469 |

FOREIGN PATENT DOCUMENTS

| | | | |
|---|---|---|---|
| JP | 2000-2553 A | | 1/2000 |
| JP | 2002-188932 A | | 7/2002 |
| JP | 2006-98174 A | | 4/2006 |
| JP | 2012-47694 A | | 3/2012 |
| JP | 2014-203370 A | | 10/2014 |
| JP | 2014203370 A | * | 10/2014 |
| JP | 6064418 B2 | * | 1/2017 |
| WO | 2019/106745 A1 | | 6/2019 |

* cited by examiner

REQUEST FOR SERVICE

INPUT RESERVATION DATE AND TIME

INPUT DEPARTURE POINT

INPUT DESTINATION

SEND REQUEST

FIG. 2B

SELECT ROUTE

| | ENERGY CONSUMPTION | DISTANCE | TIME REQUIRED | CHARGES |
|---|---|---|---|---|
| ROUTE A | 30 | 8 KM | 20 MIN. | JPY 3,000 |
| ROUTE B | 20 | 10 KM | 25 MIN. | JPY 2,000 |
| ROUTE C | 50 | 15 KM | 40 MIN. | JPY 5,000 |

WHICH ROUTE DO YOU WANT?

| ROUTE A | |
|---|---|
| ROUTE B | √ |
| ROUTE C | |

| USER ID | DEPARTURE POINT INFORMATION | DESTINATION INFORMATION | DESIRED DATE AND TIME |
|---|---|---|---|

FIG. 4B

| VEHICLE ID | LOCATION INFORMATION | VEHICLE WEIGHT | SERVICE SCHEDULE INFORMATION |
|---|---|---|---|

FIG. 4C

| ROAD LINK ID | DISTANCE | INFORMATION ON ROAD UNDULATIONS | INFORMATION ON VEHICLE SPEED |
|---|---|---|---|

FIG. 5

ENERGY CONSUMPTION ESTIMATION DEVICE AND ENERGY CONSUMPTION ESTIMATION METHOD

CROSS-REFERENCE TO RELATED APPLICATION

This application claims priority to Japanese Patent Application No. 2021-000227 filed on Jan. 4, 2021, incorporated herein by reference in its entirety.

BACKGROUND

1. Technical Field

The present disclosure relates to a technique for estimating energy consumption of a vehicle on a travel route.

2. Description of Related Art

WO 2019/106745 discloses a demand-responsive transport (DRT) system that controls vehicles that are part of a DRT service in response to a request from a user. The DRT system receives a passenger's travel request including a desired departure time, a desired arrival time, a departure point, and a destination, and creates a dispatch plan of DRT vehicles based on the travel requests collected by the specified time.

SUMMARY

In a case where a travel route is derived from the departure point and the destination requested by the passenger, such a travel route may be derived in consideration of a distance of the travel route such that the vehicle does not detour. The travel route derived based on the distance may not be energy efficient because the energy consumption when running on such a travel route is not known.

The present disclosure provides a technique capable of accurately estimating energy consumption when running on a travel route.

An energy consumption estimation device according to one aspect of the present disclosure is an energy consumption estimation device which includes a reception unit configured to receive, from a user, request information including a departure point and a destination, a route derivation unit configured to derive a plurality of travel routes based on the departure point and the destination included in the request information, an acquisition unit configured to acquire section energy consumption in a case where a vehicle travels on a road section, which is derived based on information on vehicle speed and information on road undulations, and an estimation unit configured to respectively estimate energy consumption of the vehicle in a case where the vehicle travels on the derived travel routes by adding energy consumption for road sections included in the travel route.

Another aspect of the present disclosure is an energy consumption estimation method. The method includes a step of receiving, from a user, request information including a departure point and a destination, a step of deriving a plurality of travel routes based on the departure point and the destination included in the request information, a step of acquiring section energy consumption in a case where a vehicle travels on a road section, which is derived based on information on vehicle speed and information on road undulations, and a step of estimating energy consumption of the vehicle respectively in a case where the vehicle travels on the derived travel routes by adding energy consumption for road sections included in the travel route.

With the present disclosure, it is possible to provide a technique capable of accurately estimating energy consumption when running on a travel route.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
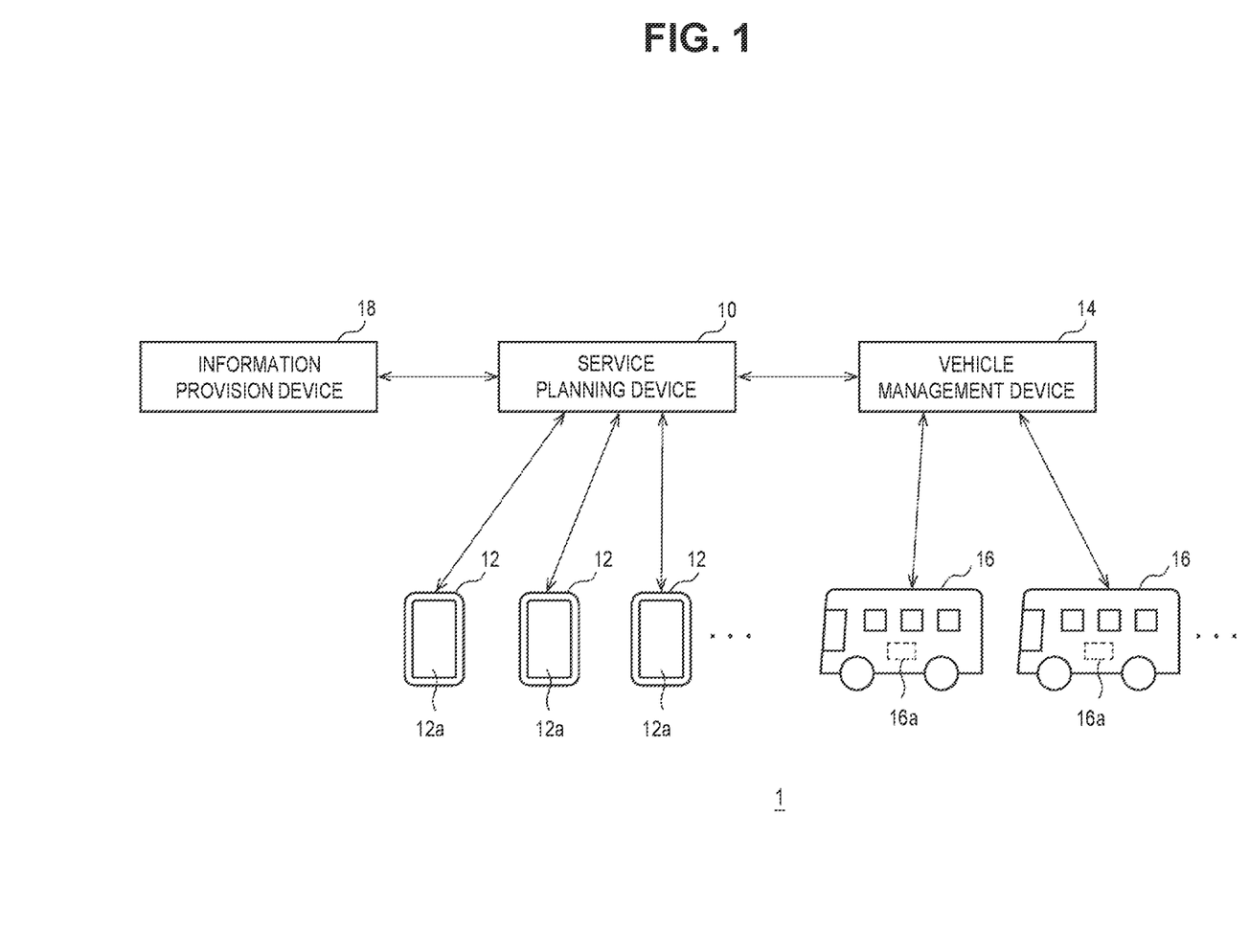
FIG. 1 is a diagram illustrating an outline of a service planning system according to an embodiment.

FIG. 1 shows an outline of a service planning system 1 according to an embodiment. The service planning system 1 includes a service planning device 10, a user terminal device 12, a vehicle management device 14, a vehicle 16, and an information provision device 18. The service planning system 1 receives a reservation for a DRT service from a user, and dispatches the vehicle 16 in response to the request to transport the user and the user's luggage. Users can share the same vehicle 16 shown in FIG. 1. In FIG. 1, a bus is depicted as the vehicle 16, but the present disclosure is not limited thereto. A small vehicle, for example, may be adopted.

The user terminal device 12 can communicate with the service planning device 10. The user terminal device 12 is provided with a display unit 12a that displays an image. The display unit 12a may be a touch-operable touchscreen. The user requests the service planning device 10 to dispatch the vehicle 16 using the user terminal device 12. The user terminal device 12 may be a mobile terminal device held by each user, and has an application program for requesting the service offered by the vehicle 16. The user terminal device 12 executes the application program and transmits request information to the service planning device 10.

The user's request information is accepted by a predetermined deadline, for example, the day before the service date, or a predetermined time before the service time. The service planning device 10 creates a service plan corresponding to the established request and transmits the plan to the vehicle management device 14.

The vehicle management device 14 manages services offered by the vehicle 16. The vehicle management device 14 can communicate with the service planning device 10 and an in-vehicle device of the vehicle 16, receives vehicle information including location information of the vehicle 16 from the vehicle 16, and transmits such information to the service planning device 10 together with vehicle information stored in advance. Further, the vehicle management device 14 receives the service plan from the service planning device 10 and controls the vehicle 16 such that the vehicle travels according to the service plan. The vehicle 16 may be capable of autonomous driving. The vehicle 16 is equipped with a rechargeable battery 16a as a travel energy source. A plurality of rechargeable batteries 16a may be mounted on the vehicle 16.

The information provision device 18 provides the road information to the service planning device 10. The road information includes information on road undulations. The road information may include traffic information for the corresponding road.

In addition, in a case where the vehicle 16 can run on each of several travel routes, it is possible to identify an energy-efficient travel route by identifying the amount of energy consumed by the service in advance. Therefore, the service planning device 10 of the embodiment functions as an energy consumption estimation device by estimating the energy consumption when the vehicle runs on each of several travel routes. Further, the service planning device 10 can accurately estimate the energy consumption based on the information on vehicle speed and the information on road undulations.

Figure 2A:
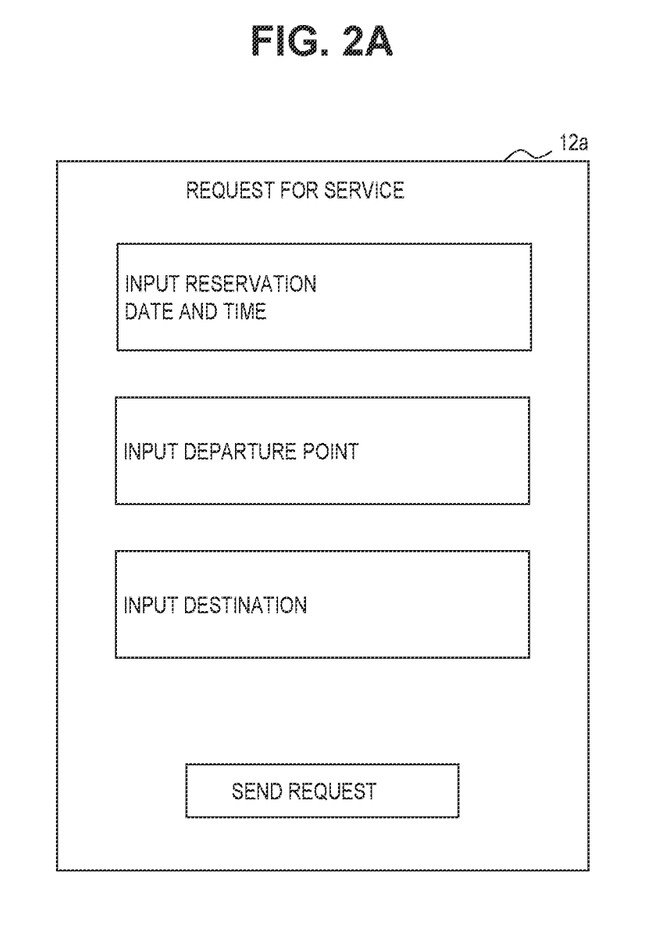
FIG. 2A is a diagram illustrating a request for a vehicle service by a user, and a view showing an image displayed when the vehicle service is requested by a user terminal device.
Figure 2B:
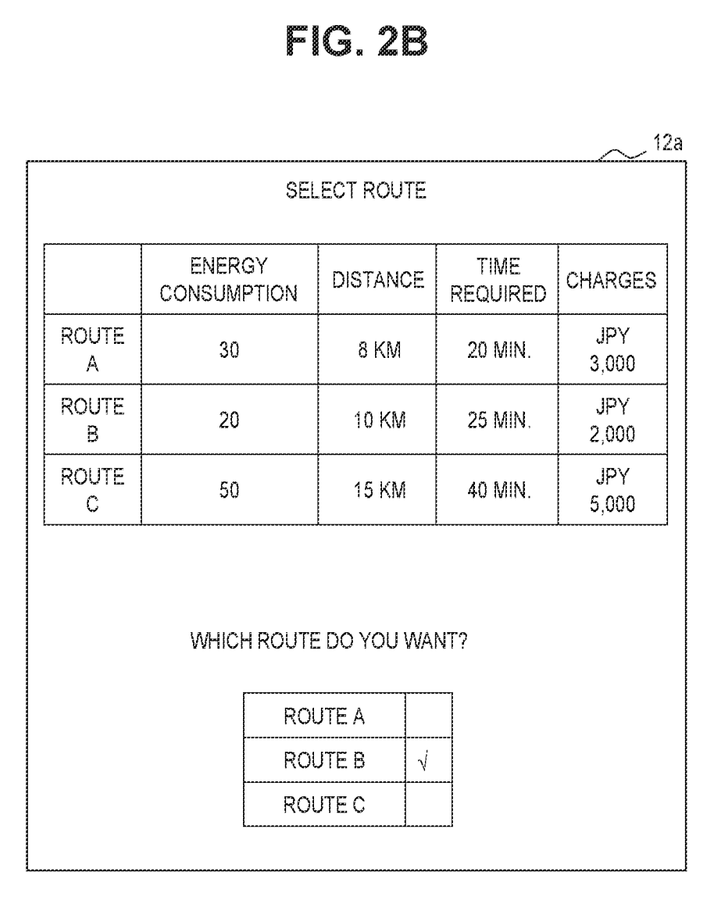
FIG. 2B is another diagram illustrating a request for the vehicle service by the user, and a view showing an image displayed when the vehicle service is requested by the user terminal device.

FIGS. 2A and 2B are diagrams respectively illustrating the request for a service by the user, and views respectively showing an image displayed when the request is made for a vehicle service offered by the vehicle 16 using the user terminal device 12. FIG. 2A shows a screen displayed by the user terminal device 12 when transmitting the request, and FIG. 2B shows a screen displayed by the user terminal device 12 when selecting a service route according to the request.

As shown in FIG. 2A, the user inputs reservation date and time, departure point, and destination into the user terminal device 12, and causes the user terminal device 12 to transmit the request information to the service planning device 10. Upon receiving the request information, the service planning device 10 derives several service routes from the departure point to the destination, and proposes those service routes to the user. Further, the service planning device 10 calculates energy consumption, distance, time required, and charges when traveling on each of the several service routes, and transmits same to the user terminal device 12.

As shown in FIG. 2B, the user terminal device 12 displays several service routes according to the request information, and allows the user to select a route that they wish to travel on. The user terminal device 12 displays the energy consumption of each service route, the distance of each service route, the travel time, and the charges. The energy consumption, time, and charges are estimated values.

In the service planning system 1 of the embodiment, the charges are set based on the energy consumption, and the user can choose a service route with lower energy consumption that may take a longer time. In addition, the vehicle 16 can travel on the service route with lower energy consumption.

Figure 3:
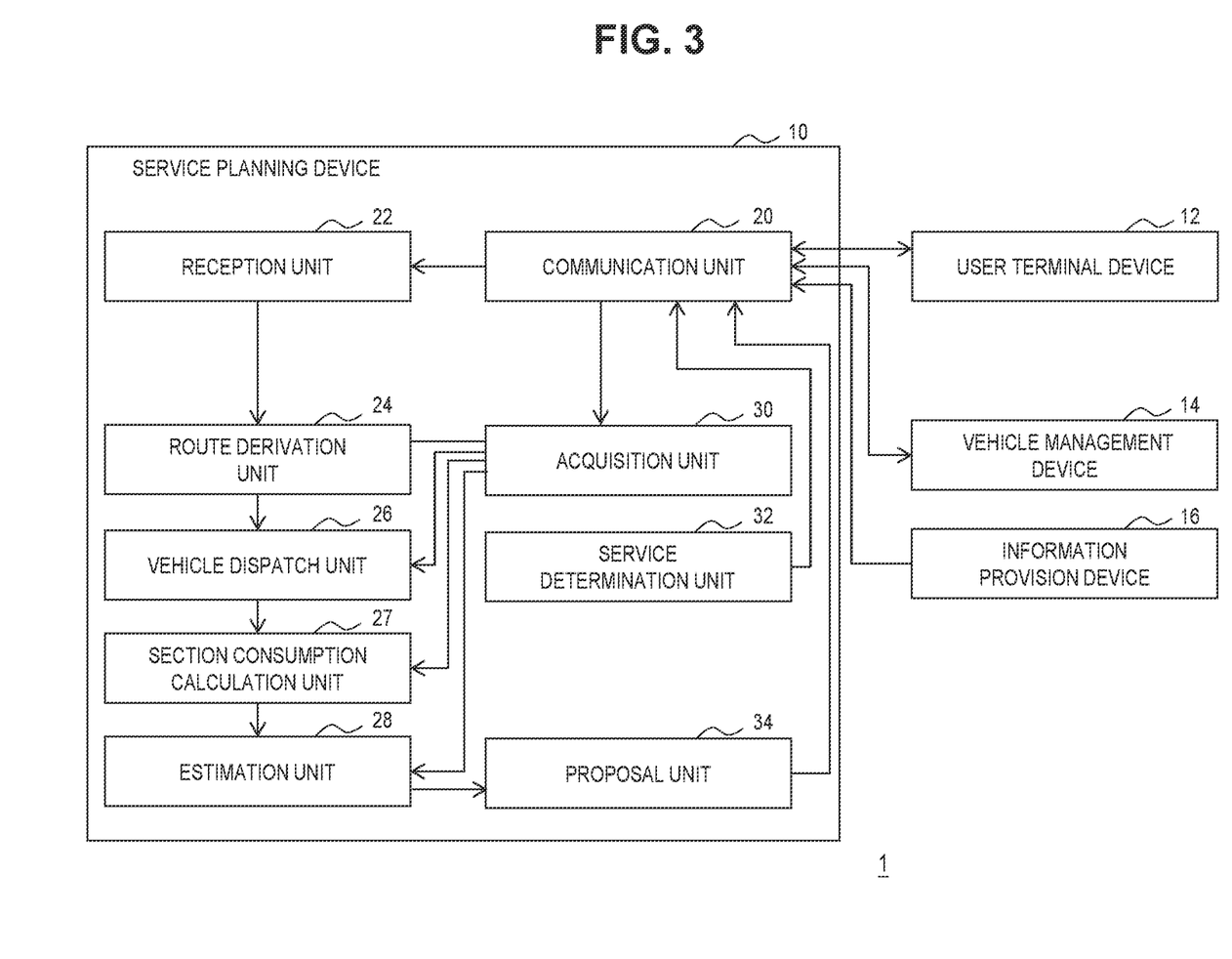
FIG. 3 is a diagram illustrating a functional configuration of the service planning system according to the embodiment.

FIG. 3 shows a functional configuration of the service planning system 1. In FIG. 3, each component that is a functional block for performing various processes can be configured by a circuit block, a memory, and other LSIs in terms of hardware, or, configured by a program loaded into the memory in terms of software. Therefore, it will be apparent to those skilled in the art that those functional blocks can be implemented in various forms by hardware only, software only, or a combination thereof, but not limited to any one of them.

The service planning device 10 includes a communication unit 20, a reception unit 22, a route derivation unit 24, a vehicle dispatch unit 26, a section consumption calculation unit 27, an estimation unit 28, an acquisition unit 30, a service determination unit 32, and a proposal unit 34. The communication unit 20 can communicate with the user terminal device 12, the vehicle management device 14, and the information provision device 18, in order to transmit and receive information.

The acquisition unit 30 acquires the vehicle information from the vehicle management device 14 and the road information from the information provision device 18. The acquisition unit 30 may acquire each piece of information at a predetermined cycle, or may acquire each piece of information when the service plan is created. Further, the estimation unit 28 receives the request information from the user terminal device 12 via the communication unit 20. These pieces of information will be described with reference to the new drawings.

Figure 4A:
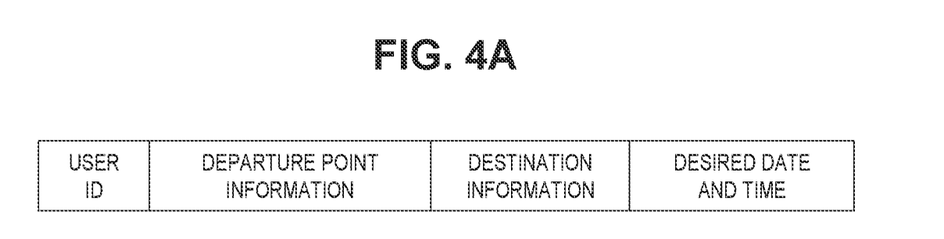
FIG. 4A is a diagram illustrating request information transmitted from the user terminal device.
Figure 4B:
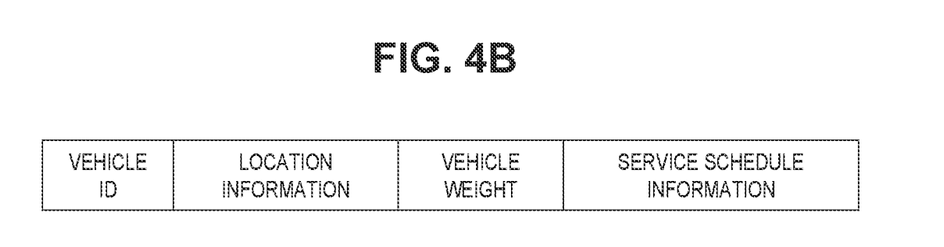
FIG. 4B is a diagram illustrating vehicle information transmitted from a vehicle management device.
Figure 4C:
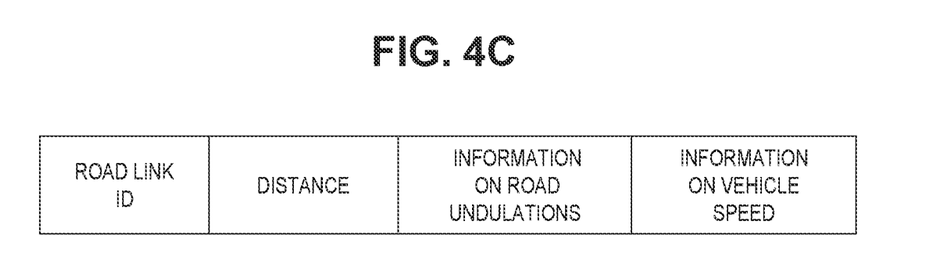
FIG. 4C is a diagram illustrating road information transmitted from an information provision device.

FIG. 4A is a diagram illustrating the request information transmitted from the user terminal device 12. FIG. 4B is a diagram illustrating the vehicle information transmitted from the vehicle management device 14. FIG. 4C is a diagram illustrating the road information transmitted from an information provision device 18.

The request information includes a user ID, departure point information, destination information, and information on a desired date and time. The departure point information and the destination information may be location information of a preset bus stop, or may be location information indicated by latitude or longitude. That is, the vehicle 16 for DRT may move between preset stops, or may move to a location desired by the user. The information on the desired date and time may specify at least one of departure time, departure time zone, arrival time, and arrival time zone. The request information may include the number of passengers and a single request may be made for a plurality of passengers.

The vehicle information shown in FIG. 4B includes vehicle ID, location information, vehicle weight, and service schedule information. The vehicle ID, which is identification information of each vehicle, is associated with the location information, the vehicle weight, and the service schedule information.

The location information of the vehicle is transmitted from the in-vehicle device of the vehicle 16 to the vehicle management device 14. The vehicle weight is used to calculate the energy consumption during the travel. The service schedule information is information on a service schedule of the vehicle 16 that has already been determined by, for example, the service planning device 10. The service schedule information may include the user ID which is used when the reservation is made. The vehicle information may further include vehicle type information, passenger capacity, regeneration performance information, and the like.

The road information shown in FIG. 4C includes road link ID, distance, information on road undulations, and information on vehicle speed. The road link ID indicates a location of a road section, and the distance indicates a distance of the section corresponding to the road link ID. The road section may be set from a branch point to another branch point, where the road branches off. The information on road undulations may be slope information of the road section corresponding to the road link ID, or altitude information of the section. The slope information may be a road slope oriented from one end to the other end of the section. The altitude information may be a height of any location in the section, or a height difference between one end and the other end of the section. That is, the altitude information may be the height of the section or the height difference between adjacent sections.

The information on vehicle speed may be, for example, an average vehicle speed obtained by collecting and averaging vehicle speeds of vehicles that have traveled on the section corresponding to the road link ID. The average vehicle speed may be calculated based on the location information and the vehicle speed transmitted to the information provision device 18 by the vehicle traveling in the section corresponding to the road link ID, or based on the vehicle speed measured by a sensor provided on the road. The average vehicle speed may be transmitted by an information provision device different from the device sending the information on road undulations.

Returning to FIG. 3, the reception unit 22 receives the request information including the departure point and the destination from the user. The route derivation unit 24 derives a travel route based on the request information. The travel route derived by the route derivation unit 24 may be referred to as a service route. Start and end points of the travel route match the departure point and the destination of the request information, respectively.

The route derivation unit 24 derives several travel routes based on the request information and the road information, including a travel route for running on a major road, a travel route for shortening the distance, and a travel route for running on a road with less undulations. The route derivation unit 24 derives several travel routes for different purposes, for example, to identify a shorter distance, a road with less undulations, or a route that has been frequently traveled on. Several travel routes derived from the same request information have the same start point and end point, but they follow different paths.

The route derivation unit 24 may derive a travel route based on travel histories of various vehicles, and may derive a travel route based on a program using a neural network. Moreover, sometimes the route derivation unit 24 can derive only one travel route within an area having a low road density. The route derivation unit 24 may derive a travel route based on several pieces of the request information, and may derive a travel route passing through the departure points and the destinations included in the pieces of the request information.

The vehicle dispatch unit 26 appropriately assigns the vehicle 16 in response to the request, based on the travel route derived by the route derivation unit 24, the desired date and time indicated by the request information, and the vehicle information acquired by the acquisition unit 30. The vehicle dispatch unit 26 may have a dispatch program for assigning the vehicle 16, and the vehicle information and the travel route may be input to the dispatch program to assign the vehicle 16.

The estimation unit 28 estimates the energy consumption of the vehicle 16 when traveling on each of several travel routes derived by the route derivation unit 24. The estimation unit 28 estimates the energy consumption based on the derived travel route, the road information of the travel route, and the vehicle information of the assigned vehicle 16. This estimation method will be described with reference to the new drawing.

Figure 5:
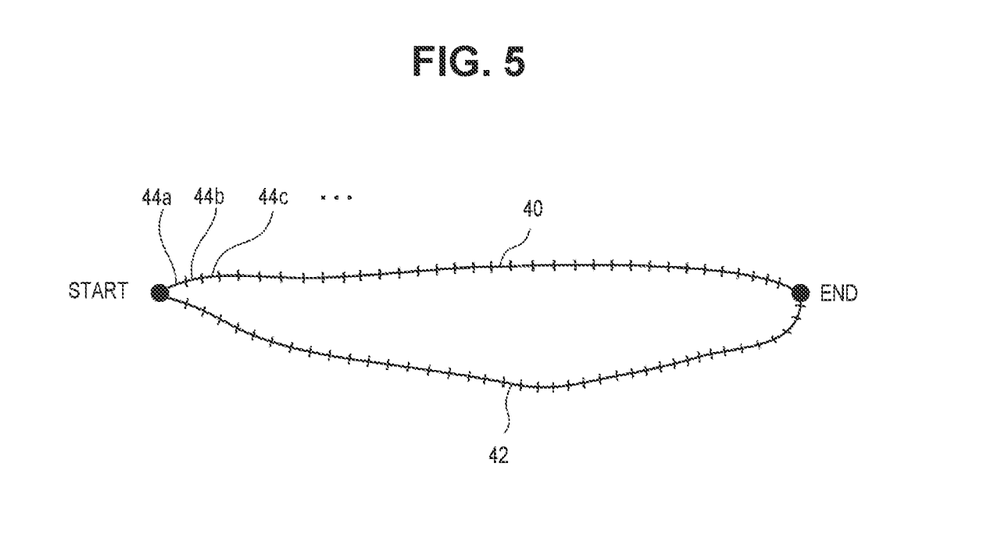
FIG. 5 is a diagram illustrating an energy consumption estimation method, and also a diagram illustrating a first travel route and a second travel route derived by a route derivation unit.

FIG. 5 is a diagram illustrating an energy consumption estimation method, and also a diagram illustrating a first travel route 40 and a second travel route 42 derived by the route derivation unit 24. The first travel route 40 and the second travel route 42 are divided into road sections corresponding to the road link IDs. For example, the first travel route 40 is divided from the starting point, such as a road section 44a, a road section 44b, and a road section 44c, in this order.

The road information includes the information on road undulations and the average vehicle speed for each road section, and the section consumption calculation unit 27 uses a calculation model shown in the following Equation (1) to derive section energy consumption E of each road section. Equation (1) is a calculation model used for traveling uphill.

$$E = C_1(Mva + Mg\Delta h + \tau Mgv) + C_2 \rho C_D A v^3 / 2 \qquad (1)$$

$C_1$ and $C_2$ represent vehicle coefficients, M represents vehicle weight, v represents average vehicle speed, a represents acceleration, $\Delta h$ represents height difference, $\tau$ represents a rolling resistance coefficient, $\rho$ represents air density, $C_D$ represents an air resistance coefficient, and A represents a front area of the vehicle. Since energy is regenerated for traveling downhill, the amount of regenerated energy is subtracted from the calculated result of Equation (1).

The section consumption calculation unit 27 calculates the section energy consumption E based on the average vehicle speed of the vehicle that has traveled on the road section and the information on road undulations of the road section. The section consumption calculation unit 27 may calculate the section energy consumption E of the road section based on vehicle speed preset as the information on vehicle speed and the information on road undulations. The preset vehicle speed may be, for example, a legal speed limit. The legal speed limit may be set for each road section. In other words, the section consumption calculation unit 27 calculates the section energy consumption E by using either the preset vehicle speed or the average vehicle speed based on the actual past history as information on vehicle speed. The section energy consumption E calculated by the section consumption calculation unit 27 is stored in a memory of the service planning device 10.

The acquisition unit 30 acquires the section energy consumption from the memory of the service planning device 10. The estimation unit 28 estimates the energy consumption when traveling on the travel route derived by the route derivation unit 24 by adding up the energy consumption for each road section included in the travel route. The estimation unit 28 estimates the energy consumption of the vehicle 16 for each of several travel routes derived by the route derivation unit 24.

By estimating the energy consumption for each travel route, it is possible to select a travel route with lower energy consumption, and thus the energy consumption can be reduced. Additionally, by calculating the section energy consumption for each of road sections into which the travel route is divided using the information on road undulations and the average vehicle speed, the estimation unit 28 can accurately calculate the energy consumption that reflects the road undulations and the vehicle speed for the road in detail.

The section energy consumption E calculated by the section consumption calculation unit 27 may be calculated in real time based on the information on vehicle speed shown in current road traffic information, but may be calculated in advance at a legal speed limit. In other words, the section energy consumption E may be stored in advance in the memory of the service planning device 10 or stored separately for uphill and downhill in the same road section while a plurality of the section energy consumptions may be stored according to the vehicle types.

Returning to FIG. 3, the estimation unit 28 estimates the estimated charges based on the estimated energy consumption. The estimated charges may be the total value of the amount proportional to the energy consumption and the basic fare. However, the charges are merely estimated values and do not determine the actual charges. Furthermore, the estimation unit 28 estimates service time based on the average vehicle speed for each road section. The vehicle often travels on a route including major roads, which may not be the shortest distance and may have large undulations, in other words, the travel route is not the most energy-efficient route. The optimum travel route can be estimated by calculating the energy consumptions, service times, and estimated charges of several travel routes in advance.

The proposal unit 34 generates proposal information that proposes, to the user, several travel routes derived based on the request information, and transmits the proposal information to the user terminal device 12 via the communication unit 20. Consequently, the proposal unit 34 can propose to the user several travel routes from which they can choose one. The proposal information that proposes a travel route to the user may include energy consumption, estimated charges, and estimated service time for each travel route. Therefore, the user can determine a travel route to travel by comparing charges and times.

The proposal unit 34 may propose to the user only one travel route having a higher priority from among several travel routes derived by the route derivation unit 24. The proposal unit 34 derives scores of several travel routes and proposes the three routes with the highest scores to the user. The proposal unit 34 derives the score based on the energy consumption and the expected service time of the travel route, and derives the score such that the score gets higher as the energy consumption is lower and the service time is shorter. Therefore, it is possible to propose the optimum travel route for the user. Further, the proposal unit 34 may select and propose at least the travel route with the lowest energy consumption from among the derived travel routes. Consequently, it is possible to guide the user to select the travel route with the lowest energy consumption.

The travel routes proposed by the proposal unit are displayed to the user through the user terminal device 12 as shown in FIG. 2B. When the user operates the user terminal device 12 and selects one of the travel routes, the selection result is transmitted from the user terminal device 12 to the service planning device 10. The acquisition unit 30 acquires the user's selection result, the service determination unit 32 determines that the vehicle will run on the travel route shown in the selection result, and creates a service plan in which the vehicle 16 and the travel route are defined. The created service plan is transmitted to the vehicle management device 14. Moreover, in a case where a plurality of users is traveling in the vehicle, the user who made the earliest request may be entitled to decide the travel route.

Figure 6:
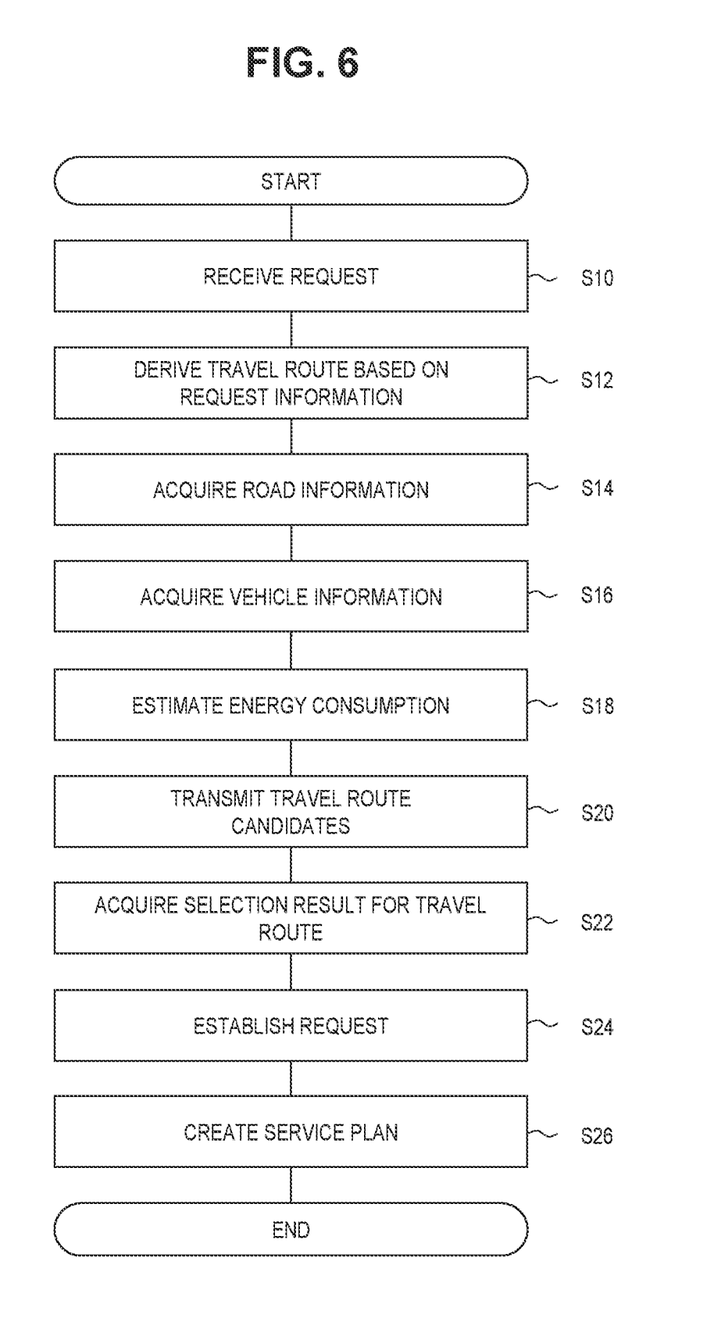
FIG. 6 is a flowchart of a process in which a service planning device of the embodiment creates a service plan.

FIG. 6 is a flowchart of a process in which the service planning device 10 of the embodiment creates a service plan. The reception unit 22 of the service planning device 10 receives the request information from the user terminal device 12 by a predetermined deadline (S10). The route derivation unit 24 derives travel routes based on the request information (S12). The vehicle dispatch unit 26 assigns the vehicle 16 according to the request information.

The acquisition unit 30 acquires the road information from the information provision device 18 (S14) and also acquires the vehicle information from the vehicle management device 14 (S16). The road information includes the average vehicle speed and the information on road undulations for each road section. The section consumption calculation unit 27 calculates the section energy consumption of the road section based on the average vehicle speed and the information on road undulations, and the estimation unit 28 adds up the section energy consumption for each road section and for each travel route to estimate the energy consumption (S18).

The proposal unit 34 transmits the travel route candidates together with their energy consumptions to the user terminal device 12 (S20). The acquisition unit 30 acquires a selection result indicating which travel route the user has selected from the user terminal device 12 (S22). The service determination unit 32 determines the vehicle 16 and the travel route corresponding to the request based on the selection result of the user so as to fulfill the request (S24), and creates the service plan (S26).

It will be apparent to those skilled in the art that the embodiments are merely examples, various modifications can be made to combinations of the components, and such modifications also fall within the scope of the present disclosure.

For example, the present embodiment shows one aspect of creating a DRT service plan, but the embodiment is not limited to this aspect. For example, the user may personally drive a vehicle. In such a case, the service planning device 10 may receive the request information defining the departure point and the destination, and propose a travel route with lower energy consumption.

What is claimed is:
1. A vehicle management system comprising:
an energy consumption estimation device comprising at least one first integrated circuit configured to:
receive, from a user, request information including a date and time, a departure point, and a destination,
assign an assigned vehicle based on the date and time included in the request information,
derive a plurality of travel routes based on the departure point and the destination included in the request information,
acquire section energy consumptions of a plurality of road sections on the plurality of the travel routes, based on the assigned vehicle travelling on the plurality of the road sections, each section energy consumption being derived based on, for a respective road section: information on the assigned vehicle, information on road undulations in the respective road section, and information on vehicle speed obtained by collecting and averaging vehicle speeds of vehicles traveling on the respective road section,
respectively estimate an estimated energy consumption of the assigned vehicle based on the assigned vehicle travelling on each travel route of the plurality of the travel routes, the estimated energy consumption being based on the section energy consumptions for the road sections on each travel route, and select a selected travel route, of the plurality of the travel routes, based on the estimated energy consumption for the assigned vehicle traveling on the selected travel route; and a vehicle management device comprising at least one second integrated circuit configured to control the assigned vehicle to autonomously travel according to the selected travel route.

2. A vehicle management method comprising:

receiving, from a user, request information including a date and time, a departure point, and a destination;

assigning an assigned vehicle based on the date and time included in the request information;

deriving a plurality of travel routes based on the departure point and the destination included in the request information;

acquiring section energy consumptions of a plurality of road sections on the plurality of the travel routes, based on the assigned vehicle travelling on the plurality of the road sections, each section energy consumption being derived based on, for a respective road section: information on the assigned vehicle, information on road undulations in the respective road section, and information on vehicle speed obtained by collecting and averaging vehicle speeds of vehicles traveling on the respective road section;

respectively estimating an estimated energy consumption of the assigned vehicle in based on the assigned vehicle travelling on each travel route of the plurality of the travel routes, the estimated energy consumption being based on the section energy consumptions for the road sections on each travel route;

selecting a selected travel route, of the plurality of the travel routes, based on the estimated energy consumption for the assigned vehicle traveling on the selected travel route; and controlling the assigned vehicle to autonomously travel according to the selected travel route.

3. The vehicle management system of claim 1, wherein the section energy consumption is derived further based on a weight of the assigned vehicle.

4. The vehicle management system of claim 3, wherein the section energy consumption is derived further based on a front area of the assigned vehicle.

5. The vehicle management system of claim 4, wherein the section energy consumption is derived based on:

$$C_1(Mva+Mg\Delta h+\tau Mgv)+C_2\rho C_D Av^3/2$$

where $C_1$ and $C_2$ represent vehicle coefficients of the assigned vehicle, M represents the weight of the assigned vehicle, v represents an average vehicle speed, a represents acceleration, $\Delta h$ represents a height difference, $\tau$ represents a rolling resistance coefficient, $\rho$ represents air density, $C_D$ represents an air resistance coefficient, and A represents the front area of the assigned vehicle.

6. The vehicle management system of claim 1, wherein the vehicle speeds of the vehicles traveling on the respective road section are collected from the vehicles traveling on the respective road section.

7. The vehicle management system of claim 1, wherein the vehicle speeds of the vehicles traveling on the respective road section are collected from a sensor located on the road section.

* * * * *